(12) United States Patent
Tatsumi

(10) Patent No.: US 7,827,888 B2
(45) Date of Patent: Nov. 9, 2010

(54) C-SHAPED CLIP INSTALLATION JIG

(75) Inventor: Riyuuichi Tatsumi, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 145 days.

(21) Appl. No.: 11/575,620

(22) PCT Filed: Aug. 19, 2005

(86) PCT No.: PCT/JP2005/015167

§ 371 (c)(1),
(2), (4) Date: Mar. 26, 2007

(87) PCT Pub. No.: WO2006/033213

PCT Pub. Date: Mar. 30, 2006

(65) Prior Publication Data

US 2007/0215755 A1     Sep. 20, 2007

(30) Foreign Application Priority Data

Sep. 21, 2004   (JP) .............................. 2004-274057

(51) Int. Cl.
*B25B 7/02* (2006.01)
(52) U.S. Cl. .............................. 81/415; 81/302; 81/489; 81/427.5
(58) Field of Classification Search ................ 248/58, 248/226.11, 228.6, 309.1; 81/427.5, 415, 81/489, 485, 486, 387, 177.4, 302, 341, 424.5
See application file for complete search history.

(56) References Cited

U.S. PATENT DOCUMENTS

| | | | |
|---|---|---|---|
| 6,023,832 A * | 2/2000 | Boe .......................... 29/426.6 |
| 6,145,417 A * | 11/2000 | Bates et al. ................... 81/387 |
| 6,470,774 B2 * | 10/2002 | Chang ......................... 81/302 |
| 6,941,846 B2 * | 9/2005 | Hsien ........................ 81/427.5 |
| 7,194,936 B2 * | 3/2007 | Engel et al. .................... 81/302 |
| 2004/0074348 A1 * | 4/2004 | Battistone .................... 81/302 |

(Continued)

FOREIGN PATENT DOCUMENTS

JP         06-083277       *   3/1994

(Continued)

*Primary Examiner*—Alfred Joseph Wujciak, III
*Assistant Examiner*—Todd M. Epps
(74) *Attorney, Agent, or Firm*—Rankin, Hill & Clark LLP

(57) ABSTRACT

A C-shaped clip 54 is set on the outer periphery of a shaft section 21 of a guide member 2. Part of the C-shaped clip 54 is held between a front edge of a clamp member 3 and the shaft section 21 by gripping a lever 4. In this case, the C-shaped clip 54 is held slantwise to situate the lower end thereof in front. Then, the shaft section 21 of the guide member 2 is inserted into a piston pin installation hole 51 of a piston. In this manner, the lower end of the C-shaped clip 54 is first fitted into an annular groove 53. If the shaft section 21 is further driven to advance while releasing the lever and releasing the holding condition by the clamp member 3, the rest of the C-shaped clip 54 is pushed into the annular groove 53 by a step section between the shaft section 21 and a joint section 22.

20 Claims, 7 Drawing Sheets

U.S. PATENT DOCUMENTS

2010/0024609 A1 * 2/2010 Chuang .................... 81/424.5

FOREIGN PATENT DOCUMENTS

| | | |
|---|---|---|
| JP | 06-083277 | 11/1994 |
| JP | 07-068432 | 3/1995 |
| JP | 09-225754 | 9/1997 |
| JP | 2002-292529 | 10/2002 |

* cited by examiner

C-SHAPED CLIP INSTALLATION JIG

TECHNICAL FIELD

The present invention relates to an installation jig for fitting a C-shaped clip into an annular groove formed in a hole for a workpiece.

BACKGROUND ART

A piston is provided with a piston pin to which a small end of a connecting rod is connected. To prevent the piston pin from coming off, a C-shaped clip is fitted into an annular groove of a hole in which the piston pin is installed.

The C-shaped clip fitting operation is manually conducted mainly using long-nose pliers and the like. Since the operation is inefficient, various devices or jigs are proposed to improve the situation.

Patent Document 1 proposes an automatic fitting device comprising an ejecting cylinder, a positioning cylinder, and a fitting cylinder. According to this automatic fitting device, C-shaped clips held within a holder are slantwise pushed into a cylindrical member, one by one, in a reduced diameter condition by the ejecting cylinder. Subsequently, the cylindrical member is lowered by the positioning member to touch a piston, wherein the clip is caused to engage the inside of an annular groove by the fitting cylinder.

Patent Document 2 proposes a device in which a receiving shaft is inserted into an insertion hole for a piston pin, a clip catcher is caused to hold a clip, the clip catcher and a pusher are caused to integrally come close to a piston, the clip held by the clip catcher is transferred to the receiving shaft with a slope, wherein the clip is pushed into the insertion hole by the pusher.

Patent Document 3 discloses a jig in which when a clip is fitted into an annular groove formed in a deep section of a hole for a workpiece, the clip is set on a tapered inlet section of the hole. In this condition, the jig which is concentrically, slidably and integrally formed with a first punch and a second punch is caused to contact the tapered inlet section of the hole, wherein the clip is first pushed into the hole in the reduced diameter condition by the outside first punch and the clip is then pushed into the annular groove formed at the deep section by the second punch.

[Patent Document 1] Japanese Patent Application Publication No. 9-225754

[Patent Document 2] Japanese Patent Application Publication No. 7-068432

[Patent Document 3] Japanese Patent Application Publication No. 2002-292529

According to the fitting device comprising the ejecting cylinder, the positioning cylinder, and the fitting cylinder disclosed in Patent Document 1, it is possible to automatically install the C-shaped clip into the annular groove. However, the device becomes large and it becomes complicated to cope with the change of device.

In the device disclosed in Patent Document 2, it is necessary to operate two jigs of the receiving shaft and the pusher separately. Such a separate operation is troublesome so that it takes time to install the clip on the clip catcher.

In the jig disclosed in Patent Document 3, since the clip must be correctly set on the tapered inlet section of the hole of the opposite member, workability is not good. Further, usability is not good because the jig cannot be used in the case where the inlet section of the hole is not tapered.

DISCLOSURE OF THE INVENTION

It is therefore an object of the present invention to provide an improved C-shaped clip installation jig which can solve the problems stated above.

In order to attain this object, according to the present invention, a C-shaped clip installation jig comprises a grip section adapted to be gripped by an operator, a guide member which is provided on the front edge of the grip section and can be inserted into the hole for a workpiece, and a clamp member which is rotatably secured to the grip section and is adapted to hold down part of the C-shaped clip between the outer periphery of the guide member and the clamp member by the operation of a lever. With this construction, even a person with no experience can surely install the C-shape clip in the shortest time.

In particular, by detachably securing the guide member to the grip section, it is possible to easily cope with the change of installation jigs if guide members of a different size are prepared in advance.

BRIEF DESCRIPTION OF THE DRAWINGS

The above and other objects, features and advantages of the present invention will become more apparent from the following description when taken in conjunction with the accompanying drawings.

BEST MODE FOR CARRYING OUT THE INVENTION

Figure 1:
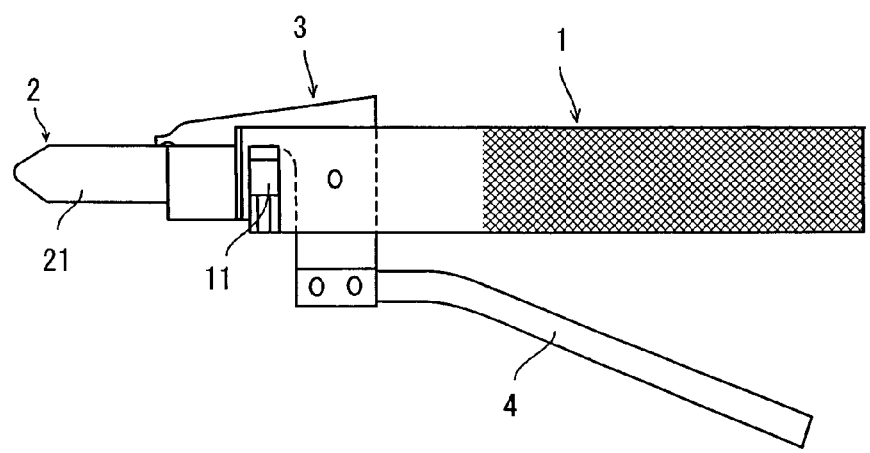
FIG. 1 is a general view of a C-shaped clip installation jig according to the present invention.
Figure 2:
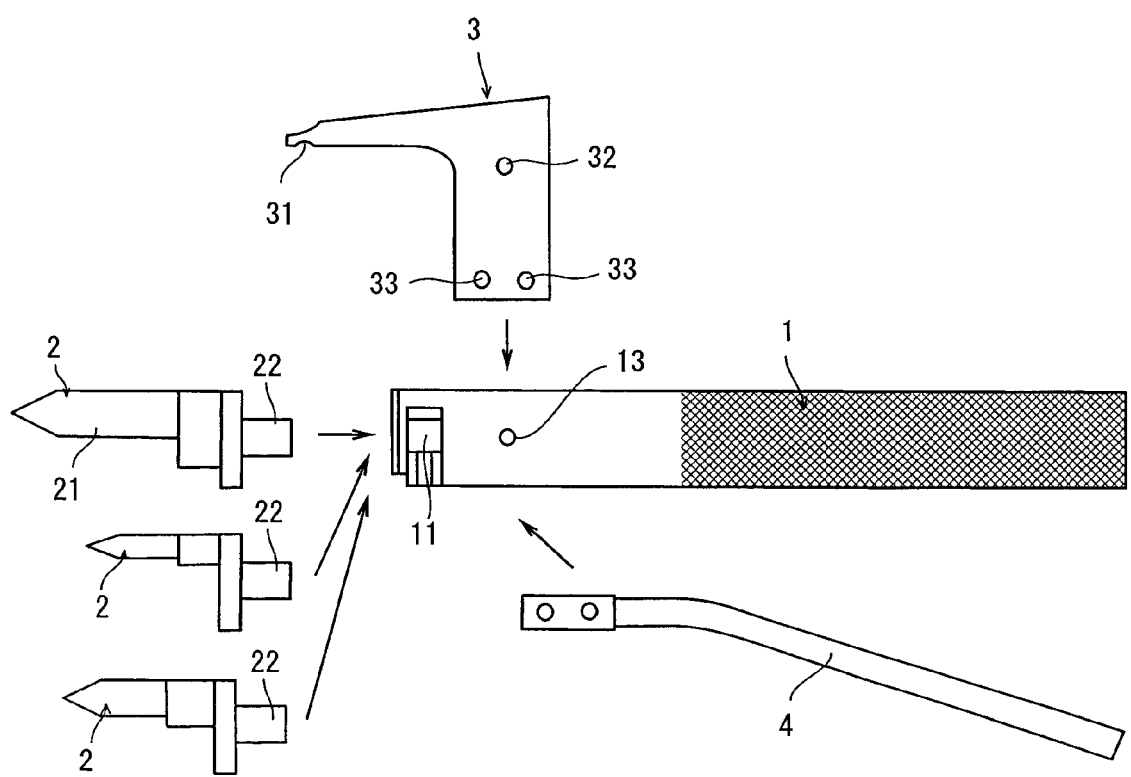
FIG. 2 is an exploded view of the C-shaped clip installation jig.
Figure 3:
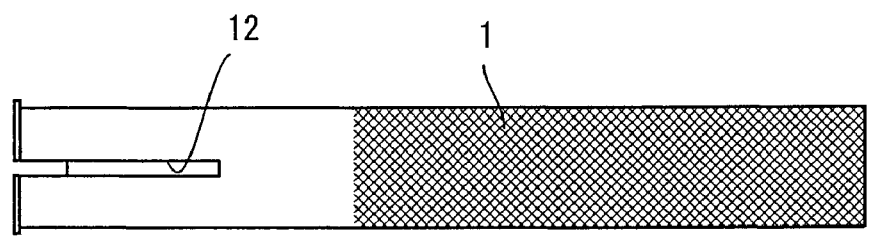
FIG. 3 is a top view of a grip section of the C-shaped clip installation jig.
Figure 4:
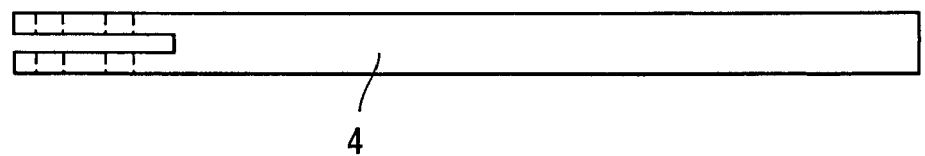
FIG. 4 is a top view of a lever.

Preferred embodiments of the present invention will now be described with reference to the accompanying drawings. FIG. 1 is a general view of a C-shaped clip installation jig according to the present invention. FIG. 2 is an exploded view of the C-shaped clip installation jig. FIG. 3 is a top view of a grip section of the C-shaped clip installation jig and FIG. 4 is a top view of a lever.

The installation jig consists mainly of a grip section 1, a guide member 2, a clamp member 3, and a lever 4.

The grip section 1 is made of a pipe member. Slip resistance by a knurling process is applied on the outer periphery of a base section of the grip section 1. An attachment 11 is secured to the front end of the grip section 1 and the top surface of the front section is axially provided with a slit 12 into which the clamp member 3 is inserted. Formed on the side thereof is a pin insertion hole 13 for rotatably supporting the clamp member 3.

The guide member 2 comprises a shaft section 21 of which the front edge is pointed to be inserted into a hole for a workpiece of a piston and the like and a joint section 22 detachably secured to the attachment 11. In this embodiment, three kinds of guide members 2 are prepared. These three kinds of guide members 2 have shaft sections 21 of which the length and diameter are different, and common joint sections 22.

The clamp member 3 is made of a plate member which is angled when seen from the side. The front edge of the clamp member 3 becomes thin and is provided with a depression 31 into which a clip is fitted. Formed on the central section of the clamp member 3 is a pin insertion hole 32 for rotatably supporting the clamp member 3 relative to the grip section 1. The lower section of the clamp member 3 is formed with an installation hole 33 for the lever 4.

The clamp member 3 is spring-biased by a spring (not shown) in the closing direction, that is, in such a direction that the front edge thereof contacts the upper surface of the guide member 2.

Figure 5:
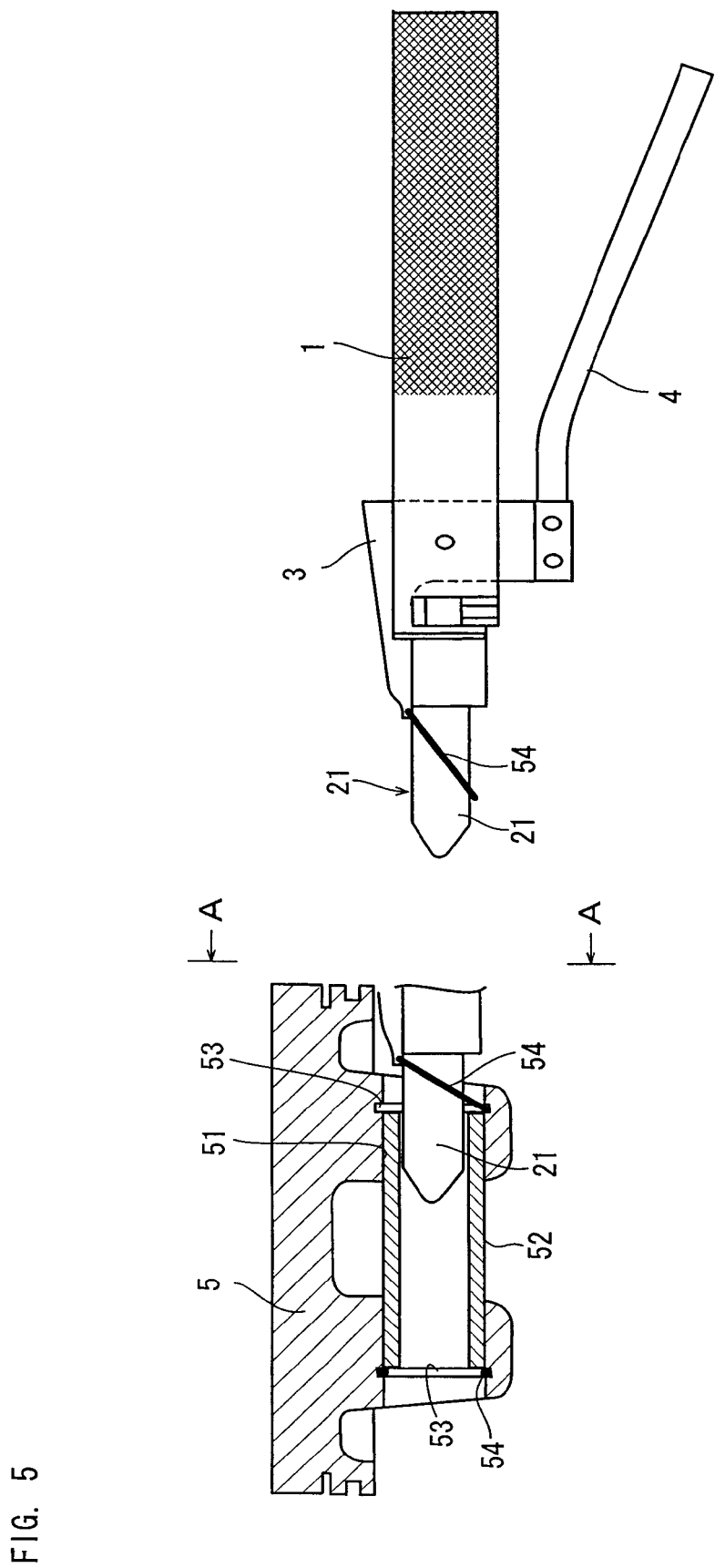
FIG. 5 is a view explaining steps for installing a C-shaped clip in an annular groove of a piston using the clip installation jig according to the present invention.

With this arrangement, steps for installing a clip into an annular groove of a piston pin installation hole will now be described with reference to FIG. 5 and FIG. 6 which is a view taken along line A-A of FIG. 5. In FIG. 5, a piston pin 52 is installed in a piston pin installation hole 51 and a C-shape clip 54 is fitted into one of annular grooves 53 and 53 formed on both ends of the piston pin installation hole 51.

As shown in FIG. 5, the C-shaped clip 54 is set on the outer periphery of the shaft section 21 of the guide member 2 and part of the C-shaped clip 54 is held between the front edge of the clamp member 3 and the shaft section 21 by gripping the lever 4. In this case, the C-shaped clip 54 is held slantwise to situate the lower end thereof in front.

Subsequently, the shaft section 21 of the guide member 2 is inserted into the piston pin installation hole 51. In this case, the lower end of the C-shaped clip 54 is first fitted into the annular groove 53. When the shaft section 21 is further advanced while releasing the lever 4 and releasing the holding condition by the clamp member 3, the rest of the C-shaped clip 54 is pushed into the annular groove 53 by a step section between the shaft section 21 and the joint section 22.

Figure 6:
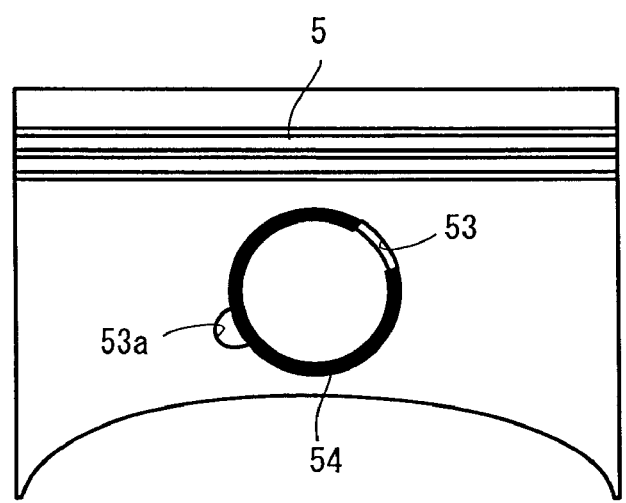
FIG. 6 is a view taken along line A-A of FIG. 5.

As shown in FIG. 6, part of the annular groove 53 is formed as a notch section 53a. When the piston is disassembled, it is necessary to remove the C-shaped clip 54. This notch section 53a serves to allow the front edge of long-nose pliers to enter. In the present embodiment, it is possible to not only install the clip, but also to remove it. Namely, when the shaft section 21 of the guide member 2 is inserted into the innermost recess of the piston pin 52, the front edge of the clamp member 3 is caused to correspond with the notch section 53a to engage part of the C-shaped clip 54 fitted into the annular groove 53 by strongly gripping the lever 4, wherein the shaft section 21 is extracted in such a condition.

According to a conventional method, the clip is removed using pliers and the like. This leads to damage or deformation of the clip and as a result, there is a disadvantage that it is difficult to remove the clip. According to the present invention, removal of the clip can also be easily performed.

Further, if the open end of the C-shaped clip 54 agrees with the notch section 53a, it is not possible to remove the C-shaped clip when disassembled. However, according to the present invention, the open end of the C-shaped clip can be situated in a fixed position of the annular groove 53.

Figure 7:
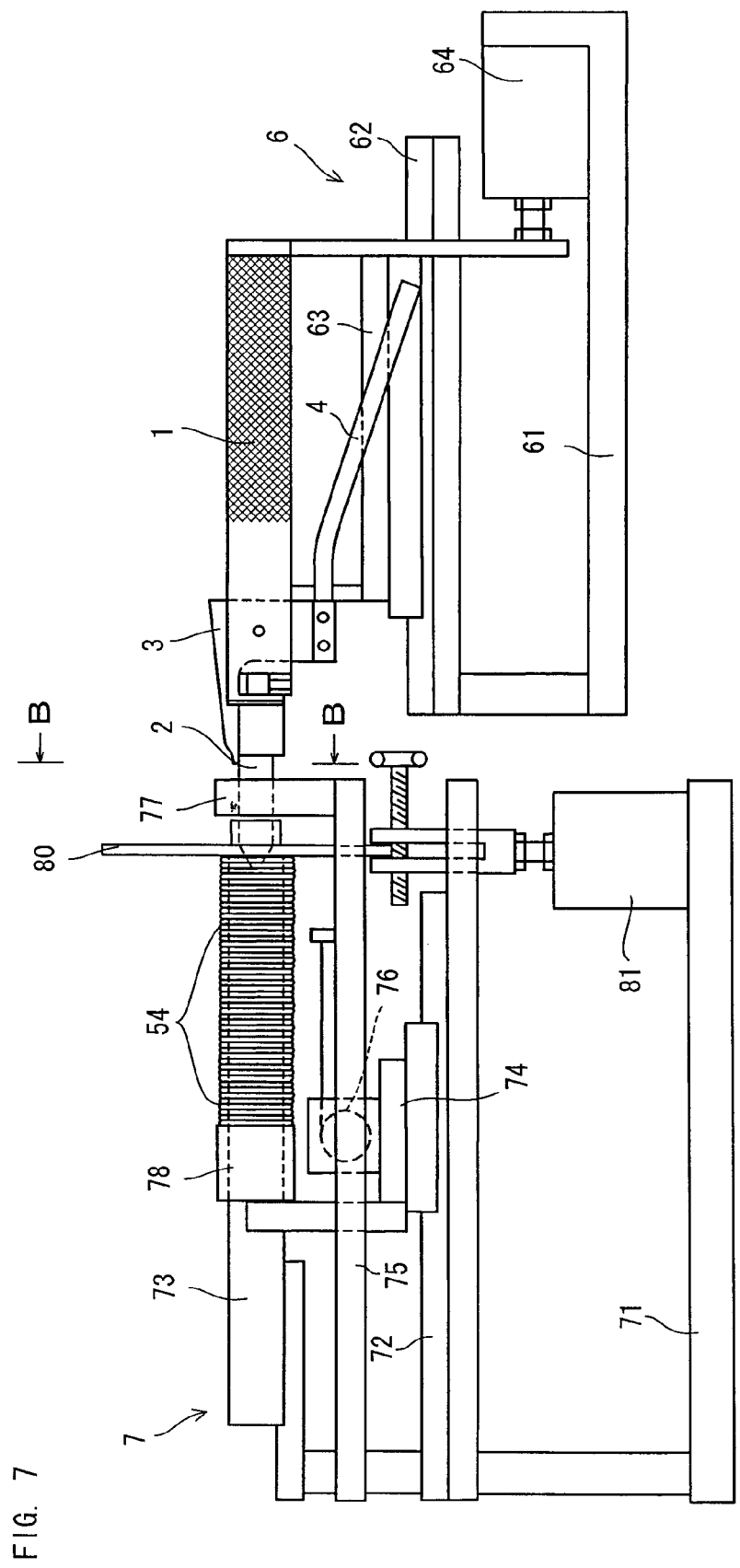
FIG. 7 is a general view of a clip-loading (installing) device provided with the C-shaped clip installation jig and a separation device according to the present invention.
Figure 8:
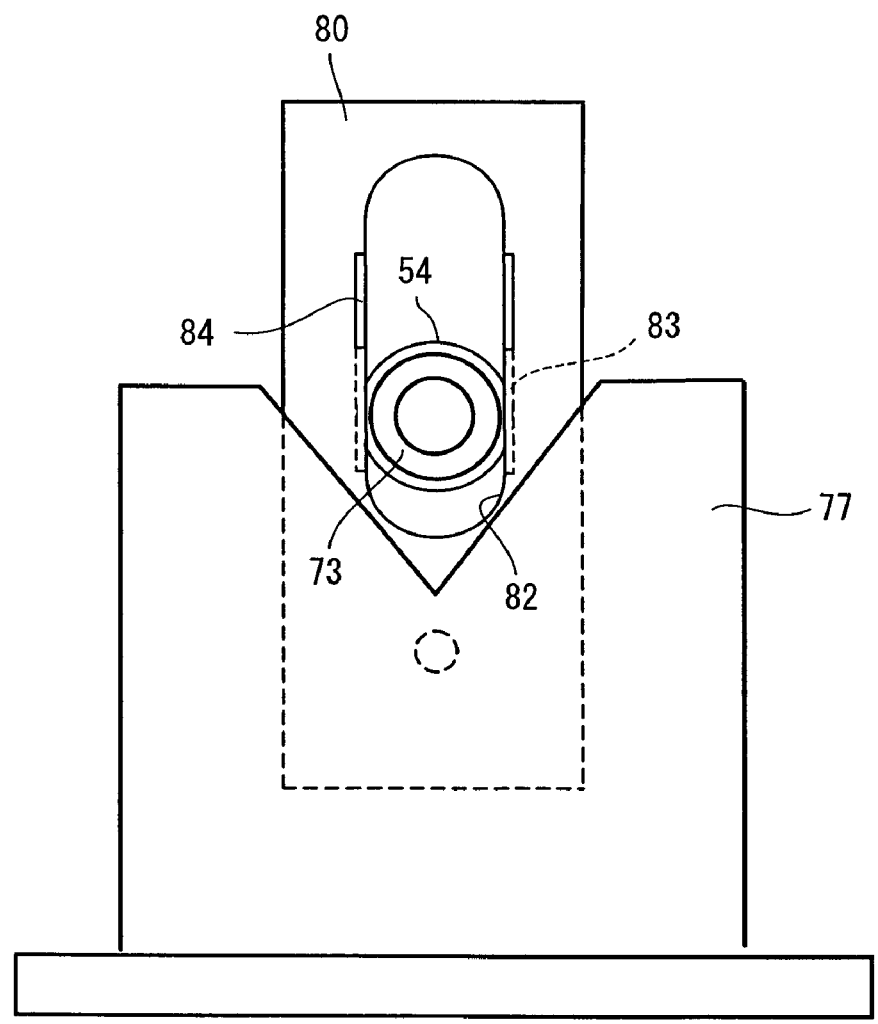
FIG. 8 is a view taken along line B-B of FIG. 7.
Figure 11:
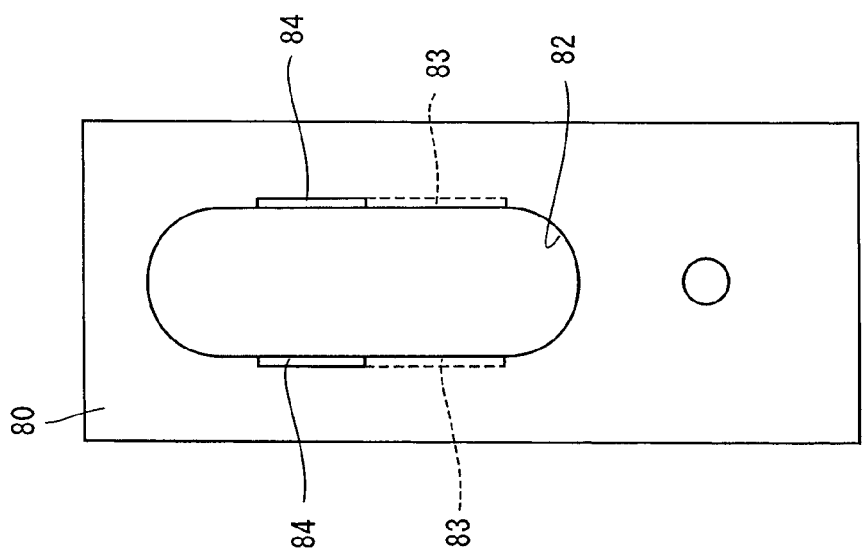
FIG. 11 is a rear view of the separating plate forming part of the separation device.
Figure 10:
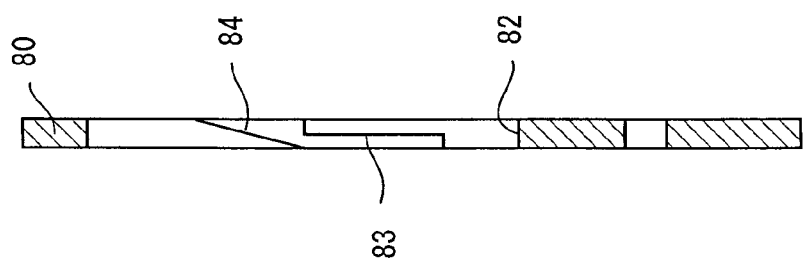
FIG. 10 is a cross-sectional view taken along line C-C of FIG. 9.
Figure 9:
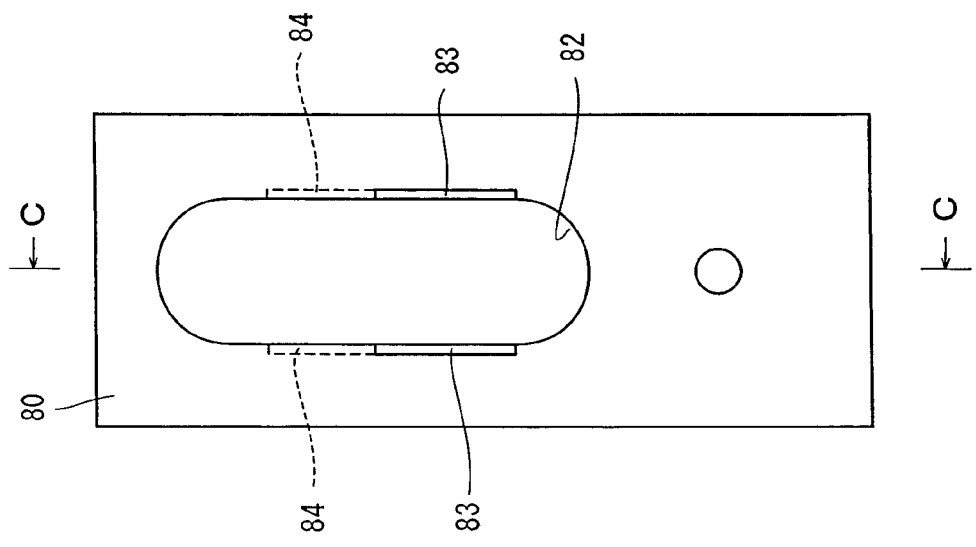
FIG. 9 is a front view of a separating plate forming part of the separation device.

In the above-mentioned embodiments, examples are explained, in which an operator sets the C-shaped clips on the shaft section 21 of the guide member 2, one by one. Examples in which the C-shape clips are automatically installed will now be explained with reference to FIGS. 7 through 11. FIG. 7 is a general view of a clip-loading (installation) device provided with a C-shaped clip installation jig and a separation device according to the present invention. FIG. 8 is a view taken along line B-B of FIG. 7. FIG. 9 is a front view of a separating plate forming part of the separation device and FIG. 10 is a cross-sectional view taken along line C-C of FIG. 9. FIG. 11 is a rear view of the separating plate forming part of the separation device.

A clip-loading device comprises an installation jig set device 6 and a separation device 7. The installation jig set device 6 is provided so that a rail 62 is disposed parallel to a base 61, the rail 62 is caused to engage a mounting base 63 for mounting and securing the C-shaped clip installation jig on the rail 62, and the mounting base 63 is designed to advance or retreat relative to (to and from) the separation device 7.

On the one hand, the separation device 7 is provided in such a manner that a rail 72 is disposed parallel to a base 71, a guide pipe 73 is disposed above and parallel to the rail 72, and the rail 72 is provided with a movable body 74. A constant force spring 76 is provided between the movable body 74 and a support plate 75 secured to the base 71.

Further, as shown in FIG. 8, a V-shaped guide plate 77 is secured to the front edge of the support plate 75. The shaft section 21 of the guide member 2 is mounted on the guide plate 77 for alignment.

One the one hand, a group of C-shaped clips 54 is installed on the outer periphery of the guide pipe 73. A ring member 78 is slidably disposed on the outer periphery of the guide pipe 73 on the rear side of the group of C-shaped clips 54 to engage part of the movable body 74. In this manner, the biasing force of the constant force spring 76 is applied to the group of C-shaped clips 54 through the movable body 74 and the ring member 78 to spring-bias the group of C-shaped clips 54 on the right side of the figure. The far right C-shaped clip 54 of the group of C-shaped clips 54 touches the separating plate 80 which is adapted to move vertically by a cylinder unit 81 firmly secured to the base 71.

The shape of the separating plate 80 is explained with reference to FIGS. 9 through 11. FIG. 9 is a front view of the separating plate and FIG. 10 is a cross-sectional view taken along line C-C of FIG. 9. FIG. 11 is a rear view of the separating plate forming part of the separation device. The separating plate 80 is formed as a rectangle when seen from the front and is provided at the center with an oval opening 82. The rectilinear right and left sides of the inner periphery of the opening 82 are provided with a step section 83 and a wedge section 84.

Figure 12:
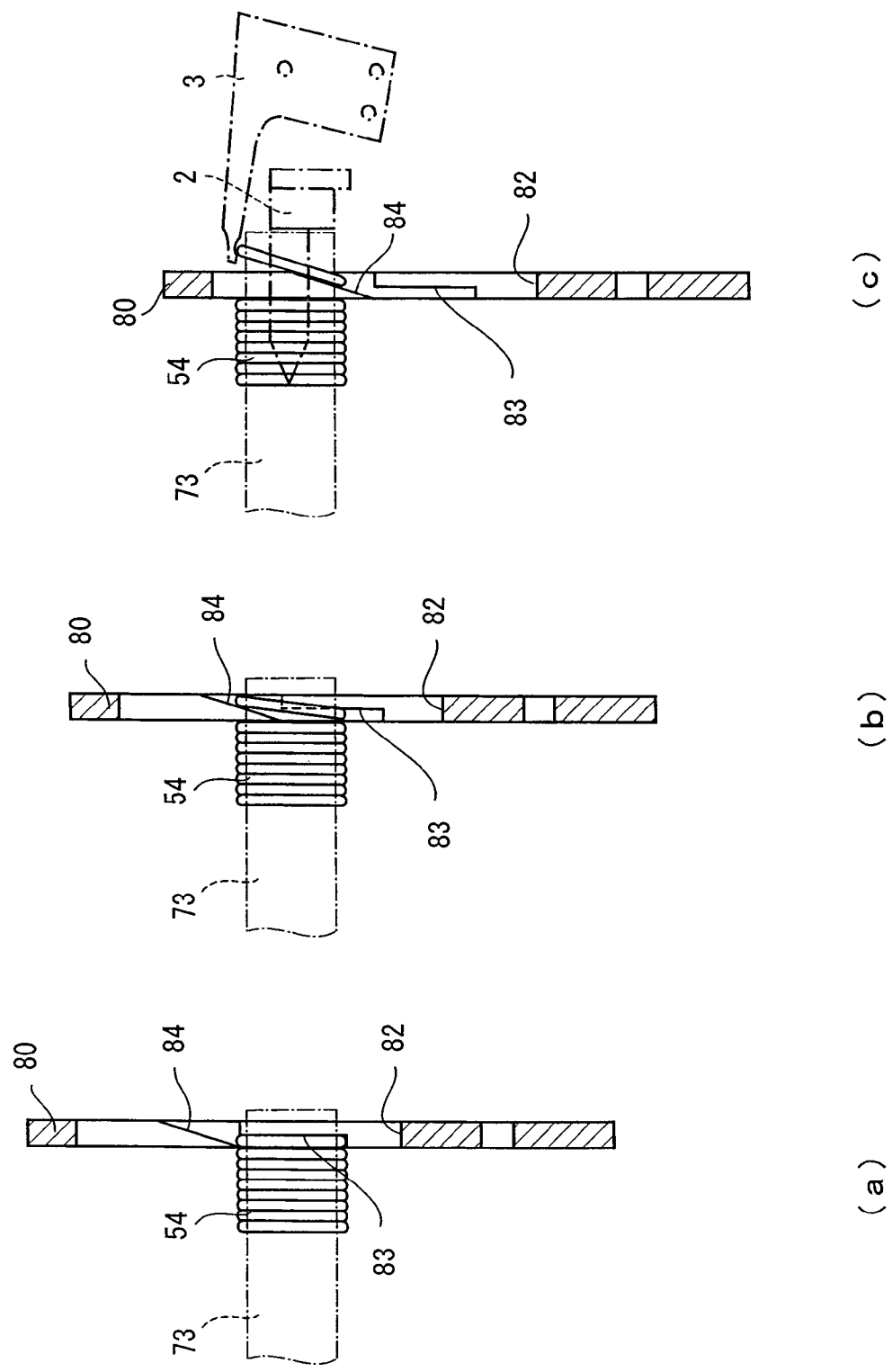
FIGS. 12 (*a*) through (*c*) are views explaining the operation of the separation device.

FIGS. 12(a) through (c) are views explaining the operation of the separation device. FIG. 12 (a) shows the condition in which the far right C-shaped clip 54 of the group of C-shaped clips 54 contacts the step section 83 of the separating plate 80 and stops under the influence of biasing force of the constant force spring 76.

If the separating plate 80 is lowered from this condition by the actuation of the cylinder unit 81, the wedge section 84 is driven between the far right C-shaped clip 54 and the subsequent C-shaped clip 54 as shown in FIG. 12 (b) and as a result, the upper section of the far right C-shaped clip 54 is separated to fall down on the right side. If the separating plate 80 is further lowered, the far right C-shaped clip 54 is completely separated as shown in FIG. 12 (c).

Thus, the separated C-shaped clip 54 is held by the front edge of the clamp member 3 for preparation of the subsequent clip installation. By improving the front edge shape of the clamp member 3, it is possible to separate the C-shaped clip 54 and to allow the upper end of the C-shaper clip 54 to enter under the clamp member 3 at the same time.

INDUSTRIAL APPLICABILITY

The C-shaped clip installation jig according to the present invention can be effectively used in such a process where the clip installation is carried out by conventional pliers.

According to the invention, gripping and releasing of the clip can be performed only by the operation of a lever. Since such an operation can be performed with only one hand, operationality is extremely good and it is not affected by the skillfulness of the operator. Number of parts used can also be reduced to make the jig lightweight. Thus, the jig is costwise advantageous and production can also be easily performed.

Further, the clip installation jig according to the present invention can also be used to remove the clip from the existing piston and the like.

The invention claimed is:

1. A C-shaped clip installation jig for fitting a C-shaped clip into an annular groove formed in a hole for a workpiece comprising:
    a grip section adapted to be gripped by an operator,
    a guide member provided on a front edge of the grip section, wherein a front portion of the guide member is defined by a shaft, said shaft being adapted to be inserted into the hole for the workpiece and to abut an inner circumferential surface of the C-shaped clip, and
    a clamp member rotatably secured to the grip section and adapted to releasably hold the C-shaped clip by pinching a part of the C-shaped clip between a front edge of the clamp member and an outer periphery of the shaft of the guide member by operation of a lever, wherein the front edge of the clamp member is movable between a pinch position where the front edge of the clamp member abuts the shaft of the guide member and an open position where the front edge of the clamp member is spaced from the shaft of the guide member.

2. A C-shaped clip installation jig for fitting a C-shaped clip into an annular groove formed in a hole for a workpiece comprising:
    a grip section adapted to be gripped by an operator;
    a plurality of guide members that are each detachably securable to a front edge of the grip section, wherein each of the plurality of guide members comprise a uniquely sized shaft that defines a front portion thereof, said shafts being adapted to abut an inner circumferential surface of a similarly sized C-shaped clip and to be slidably inserted into the hole for the workpiece; and
    a clamp member rotatably secured to the grip section and adapted to releasably hold a part of the C-shaped clip against an outer periphery of the shaft of the guide member that is detachably secured to the front edge of the grip section by operation of a lever, wherein the clamp member includes a front edge that is movable between a pinch position where the front edge of the clamp member abuts the shaft of the guide member and an open position where the front edge of the clamp member is spaced from the shaft of the guide member.

3. The C-shaped clip installation jig according to claim 1, wherein the pinched part of the C-shaped clip that is held against the outer periphery of the shaft of the guide member by the front edge of the clamp member is disposed relatively closer to the grip section in a longitudinal direction than is a remaining part of the C-shaped clip.

4. The C-shaped clip installation jig according to claim 2, wherein the part of the C-shaped clip that is held against the outer periphery of the shaft of the guide member by the clamp member is disposed relatively closer to the grip section in a longitudinal direction than is a remaining part of the C-shaped clip.

5. The C-shaped clip installation jig according to claim 1, wherein the C-shaped clip is held slantwise relative to a longitudinal axis of the grip section.

6. The C-shaped clip installation jig according to claim 2, wherein the C-shaped clip is held slantwise relative to a longitudinal axis of the grip section.

7. The C-shaped clip installation jig according to claim 3, wherein the C-shaped clip is held slantwise relative to a longitudinal axis of the grip section.

8. The C-shaped clip installation jig according to claim 4, wherein the C-shaped clip is held slantwise relative to a longitudinal axis of the grip section.

9. The C-shaped clip installation jig according to claim 1, wherein the clamp member is adapted to abut an outer surface of the C-shaped clip while the shaft abuts an inner circumferential surface of the C-shaped clip.

10. The C-shaped clip installation jig according to claim 9, wherein a front end of the shaft of the guide member is disposed relatively forward from a front end of the clamp member in a longitudinal direction.

11. The C-shaped clip installation jig according to claim 1, wherein the front portion of the guide member is spaced from the front edge of the grip section.

12. The C-shaped clip installation jig according to claim 2, wherein the front portion of the guide member is spaced from the front edge of the grip section.

13. The C-shaped clip installation jig according to claim 1, wherein the guide member further comprises a joint section received in and secured to the grip section.

14. The C-shaped clip installation jig according to claim 13, wherein the joint section and the front portion are disposed at opposite ends of the guide member.

15. The C-shaped clip installation jig according to claim 14, wherein the joint section is defined by a joint shaft, and said grip section defines an opening for receiving the joint shaft.

16. The C-shaped clip installation jig according to claim 2, wherein each of the guide members further comprise a joint section received in and detachably secured to the grip section.

17. The C-shaped clip installation jig according to claim 16, wherein the joint section and the front portion are disposed at opposite ends of each of the guide members.

18. The C-shaped clip installation jig according to claim 17, wherein each of the joint sections is defined by a joint shaft, and said grip section defines an opening for receiving said joint shaft.

19. The C-shaped clip installation jig according to claim 18, wherein the joint shafts for each of the guide members are identical to one another.

20. The C-shaped clip installation jig according to claim 2, wherein the clamp member is adapted to abut an outer surface of the C-shaped clip while the shaft abuts an inner circumferential surface of the C-shaped clip.

\* \* \* \* \*